United States Patent [19]
Kramer

[11] Patent Number: 5,150,534
[45] Date of Patent: Sep. 29, 1992

[54] APPARATUS FOR THE BILATERAL BLOWING ONTO A WEB-LIKE OR SHEET-LIKE MATERIAL

[75] Inventor: Carl Kramer, Aachen, Fed. Rep. of Germany

[73] Assignee: WSP Ingenieurgesellschaft fur Warmetechnik, Stromungstechnik und Prozesstechnik mit beschrankter Haftung, Aachen, Fed. Rep. of Germany

[21] Appl. No.: 671,241

[22] Filed: Mar. 19, 1991

[30] Foreign Application Priority Data

Mar. 30, 1990 [DE] Fed. Rep. of Germany ....... 4010280

[51] Int. Cl.⁵ ............................................ F26B 13/00
[52] U.S. Cl. ....................................... 34/155; 34/156; 226/97
[58] Field of Search ................. 34/155, 156, 217, 216, 34/160, 23; 226/97

[56] References Cited

U.S. PATENT DOCUMENTS

| | | | |
|---|---|---|---|
| 2,582,241 | 1/1952 | Dungler | 34/160 |
| 2,640,277 | 6/1953 | Dungler | 34/160 |
| 3,036,385 | 5/1962 | Russell | 34/160 |
| 3,371,430 | 3/1968 | Bowman | 34/217 |
| 3,633,281 | 1/1972 | Vits | 34/156 |
| 4,137,649 | 2/1979 | Fleissner | 34/160 |
| 4,189,849 | 2/1980 | van der Schoot | 34/217 |
| 4,227,317 | 10/1980 | Fleissner | 34/217 |
| 4,320,587 | 3/1982 | Vits | 34/156 |
| 4,425,719 | 1/1984 | Klein et al. | 34/156 |
| 4,785,986 | 11/1988 | Daane et al. | 34/160 |

FOREIGN PATENT DOCUMENTS 2265313 8/1977 Fed. Rep. of Germany .
2056190 2/1978 Fed. Rep. of Germany .
2446983 9/1985 Fed. Rep. of Germany .

OTHER PUBLICATIONS

"Apparatuses for the heat treatment of contactlessly guided sheet metal strips", published in Bänder Blache Rohre, Nov. 1975, pp. 453-456, 476.

Primary Examiner—Henry A. Bennet
Assistant Examiner—Denise L. F. Gromada
Attorney, Agent, or Firm—Armstrong, Nikaido, Marmelstein, Kubovcik & Murray

[57] ABSTRACT

An apparatus for the bilateral blowing of a treatment gas onto a web-shaped material comprises a treatment space for the approximately rectilinearly moved web-like or sheet-like material, nozzle ribs arranged on both sides of the web-like or sheet-like material for introducing the treatment gas stream into the treatment space and radial fans for generating the treatment gas stream on the one hand and symmetrical extraction of the treatment gas from the treatment space on the other hand; each radial fan is installed into a 360° spiral housing; the two radial fans are arranged point symmetrical at 180° and each blow into a blow-out duct disposed on the longitudinal side of the apparatus; and each blow-out duct comprises a first region of constant or approximately constant cross-setion and a distributor piece with cross-section diminishing in the flow direction.

11 Claims, 4 Drawing Sheets

APPARATUS FOR THE BILATERAL BLOWING ONTO A WEB-LIKE OR SHEET-LIKE MATERIAL

BACKGROUND OF THE INVENTION

1. Field of the Invention

The invention relates to an apparatus for the bilateral blowing of a treatment gas onto a web-like or sheet-like material comprising a treatment space for the approximately rectilinearly moved web-like or sheet-like material, nozzle ribs arranged on both sides of such material for introducing the treatment stream into the treatment space and radial fans on the one hand for generating the treatment stream supplied to the nozzle ribs from one side and on the other hand for extracting the treatment gas from the treatment space on the opposite side.

2. Description of the Prior Art

Such apparatuses are used in the heat treatment of material webs or sheets, such as of textiles or metal sheets, plates or strips of glass and other similar products, for the purpose of heat exchange and also for drying purposes. Hereinafter the term web-like material covers both endless webs and sheets of material and the term material web also covers material sheets. To ensure as uniform as possible a blowing onto the surface of the web-like material nozzle ribs having nozzle openings are provided transversely of the transport direction of the web.

The gap between two adjacent nozzle ribs is available as flow-off cross-section for the treatment gas flow blown with the nozzles onto the web or sheet, the web usually being guided horizontally. The guiding, for example in the case of light strips, may be contactless by means of floating nozzles; in particular in the case of heavy web-like materials, rollers are arranged between the nozzle ribs of the lower nozzle field, said rollers supporting the web-like material and, in the case of driven rollers, simultaneously conveying said material.

In particular in the case of relatively wide web-like or strip-like materials a uniform convective influencing with the treatment gas stream is ensured only if the flowing back of the treatment gas stream takes place completely uniformly on both sides of the web, i.e. upwardly and downwardly. In the article "Apparatuses for the heat treatment of contactlessly guided sheet metal strips" by Kramer, Stein and Gerardt, published in "BANDER BLECHE ROHRE", Nov. 1975, p. 453 et seq., it is proposed for this purpose to provide fans above and below the web plane, the flow path for the upper and lower half of the apparatus thereby being symmetrical with respect to the lay. However, the serious disadvantage arises here that the fans serving as flow drive for the treatment gas stream acting on the web from below cannot be installed in the space still available beneath the nozzle ribs down to the floor. To maintain the working height of about 1 m to 1.5 m usual for material webs it is therefore necessary to provide beneath such an apparatus a pit which is so dimensioned that dismantling of the fans arranged beneath the material web is possible and in addition enough room is available for inspection and maintenance work. Consequently, such a pit involves a high technical and economic expenditure for the installation of a constructional form of this type.

German Pat. No. 2,446,983 further discloses an apparatus for bilateral blowing of a treatment gas onto a web-like material in which nozzle ribs arranged on both sides of the web-like material are provided for the introduction of the treatment stream into the treatment space and a fan is provided on the one hand on one side of the nozzle ribs substantially in the centre of the treatment space and has a horizontal axis for generating the treatment gas stream supplied to the nozzle ribs from one side and on the other hand a fan is provided on the opposite side for symmetrical extraction of the treatment gas. Since the radial fans for driving the stream are arranged laterally of the material web even with relatively large web widths no pit is necessary beneath the apparatus. Moreover, the flow guide above and beneath the plane of the material web is completely symmetrical and is therefore particularly suitable for the floating guiding of material webs, i.e. for example as floating furnace or floating drier for strips.

However, if in such an apparatus the material web has to be led over rollers as is necessary for example in the heat treatment of glass sheets, due to the arrangement of the radial fan with its discharge housing on one side of the material web there are restrictions on passing the rollers transversely through the apparatus and the location on the fan side and this is moreover very difficult.

Furthermore, the rollers must be substantially longer than the web width. This is another serious disadvantage in particular in apparatuses which have to be operated at relatively high temperatures.

A similar apparatus is disclosed in German published specification 2,056,190 where a radial fan is incorporated in a 360° spiral housing and blows into a single discharge duct of constant cross-section.

Such a housing is suitable only if considerable losses in efficiency are accepted for fans with a high reaction degree in which the pressure development takes place substantially in the impeller. In fans with radially terminating or forwardly curved blades and in particular with drum impeller fans such a housing is completely unsuitable. Moreover, the apparatus according to the published specification has only a single fan on each side of the material web supplying simultaneously the nozzle arms arranged above and below the material web. As a result, with such an apparatus the nozzle pressure of the upper nozzle arms cannot be varied with respect to the nozzle pressure of the lower nozzle arms.

Finally, this apparatus is intended for blowing treatment of textile webs of fibres, for example chemical fibres, which as a rule are air-permeable. The ventilation conditions are therefore completely different than with air-impermeable materials and consequently a completely symmetrical flow path above and beneath the material web plane is practically impossible.

Finally, German specification as laid open to inspection 2,265,313 also discloses a continuous drier for webbed materials having only one air conveyer, the air guiding of which is first linear, then upwardly offset 90°, then 90° laterally offset and finally merges offset 90° in a further air supply conduit. This extremely unfavourable flow guide makes any setting of defined flow conditions impossible.

SUMMARY OF THE INVENTION

The invention therefore has as its object the provision of an apparatus for bilateral blowing of a treatment gas onto a web-like or sheet-like material of the type set forth at the beginning which ensures a completely symmetrical flow guiding above and beneath the material web or sheet plane and with usual working heights permits simple setting up on the floor without additional steps, such as foundation structures or pits.

The invention therefore proposes in an apparatus for the bilateral blowing of a treatment gas onto a web-like or sheet-like material comprising a treatment space for the approximately rectilinearly moved web-like or sheet-like material, nozzle ribs arranged on both sides of the web-like or sheet-like material for introducing the treatment stream into the treatment space and radial fans on the one hand for generating the treatment stream supplied to the nozzle ribs from one side and on the other hand for extracting the treatment gas from the treatment space on the opposite side, the improvement in which on each side of the material web in a unit of such an apparatus a radial fan installed in a 360° spiral housing is arranged;

the two radial fans are arranged on both sides of the material web or sheet in each case point-symmetrical at 180° to the centre of the apparatus and each blow into a blow-out duct disposed at the longitudinal side of the apparatus and each blow-out duct comprises a first region with constant or approximately constant cross-section and a distribution piece of cross-section diminishing in the flow direction.

Expedient embodiments are defined by the features of the subsidiary claims.

The advantages achieved with the invention reside in that the basic construction of such an apparatus is suitable both for floating guiding of material webs or sheets and for roller guiding, the support rollers having only the minimum length defined by the desired web or sheet width. It is ensured that at the lower side and upper side of the material web or sheet the same heat transfer occurs.

BRIEF DESCRIPTION OF THE DRAWINGS

The invention will be described in more detail hereinafter with reference to an example of a high-convection furnace for heating glass panes guided over rollers with the aid of the attached schematic drawings, wherein.

DESCRIPTION OF THE PREFERRED EMBODIMENTS

Figure 1:
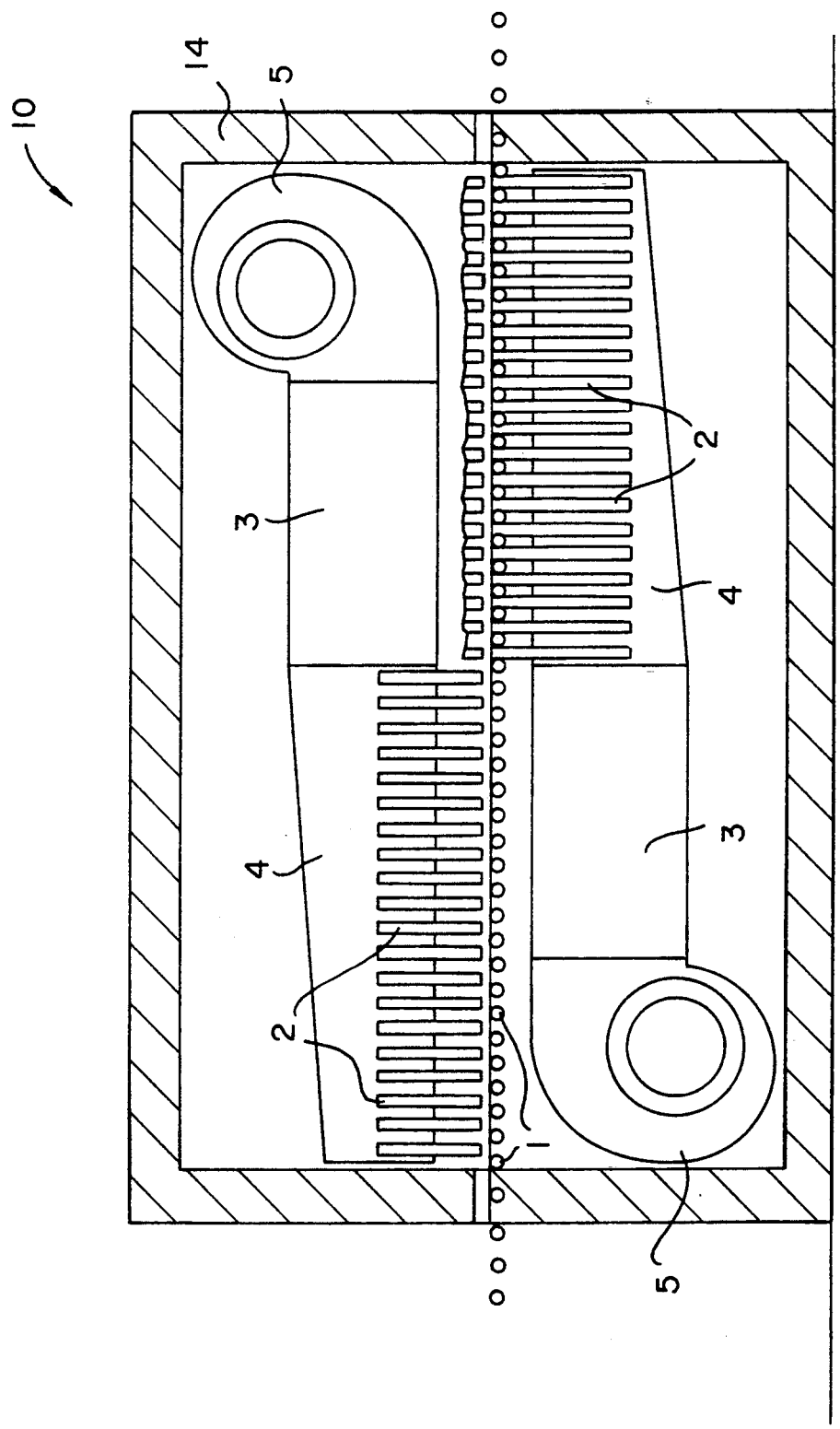
FIG. 1 is a schematic longitudinal section through such a high-convection furnace.

The high-convection heating apparatus for glass sheets 12 (see FIG. 4) illustrated in FIGS. 1 to 4 is denoted generally by the reference numeral 10 and comprises a closed treatment chamber or space 14 which in the embodiment illustrated has a rectangular cross-section in vertical section, i.e. the walls of the treatment space 14 form a box of rectangular cross-section.

The glass sheets 12 lie on driven rollers 1 and are transported by said rollers 1 through the high-convection heating apparatus 10. To avoid inadmissible deformations of the glass sheets 12 softened by the heating, the rollers 1 must be spaced correspondingly narrowly, i.e. have only a small distance between them, as can be seen for example from FIGS. 1 and 3.

The relatively large working width of such glass sheets 12 also requires a relatively large diameter of the rollers 1. When using ceramic rollers the usual roller diameters are about 1/40 of the free unsupported roller span. For usual dimensions of the glass sheets 12 to be treated this is shown approximately true to scale in FIG. 4.

A heated treatment gas stream, in particular air, is blown by nozzle ribs 2 from below (nozzle ribs $2_u$) and from above (nozzle ribs $2_o$) onto the glass sheets 12, the lower nozzle ribs $2_u$ being disposed between the rollers 1, i.e. the rollers 1 and the nozzle ribs $2_u$ alternate as can be seen in particular from FIG. 4.

Figure 4:
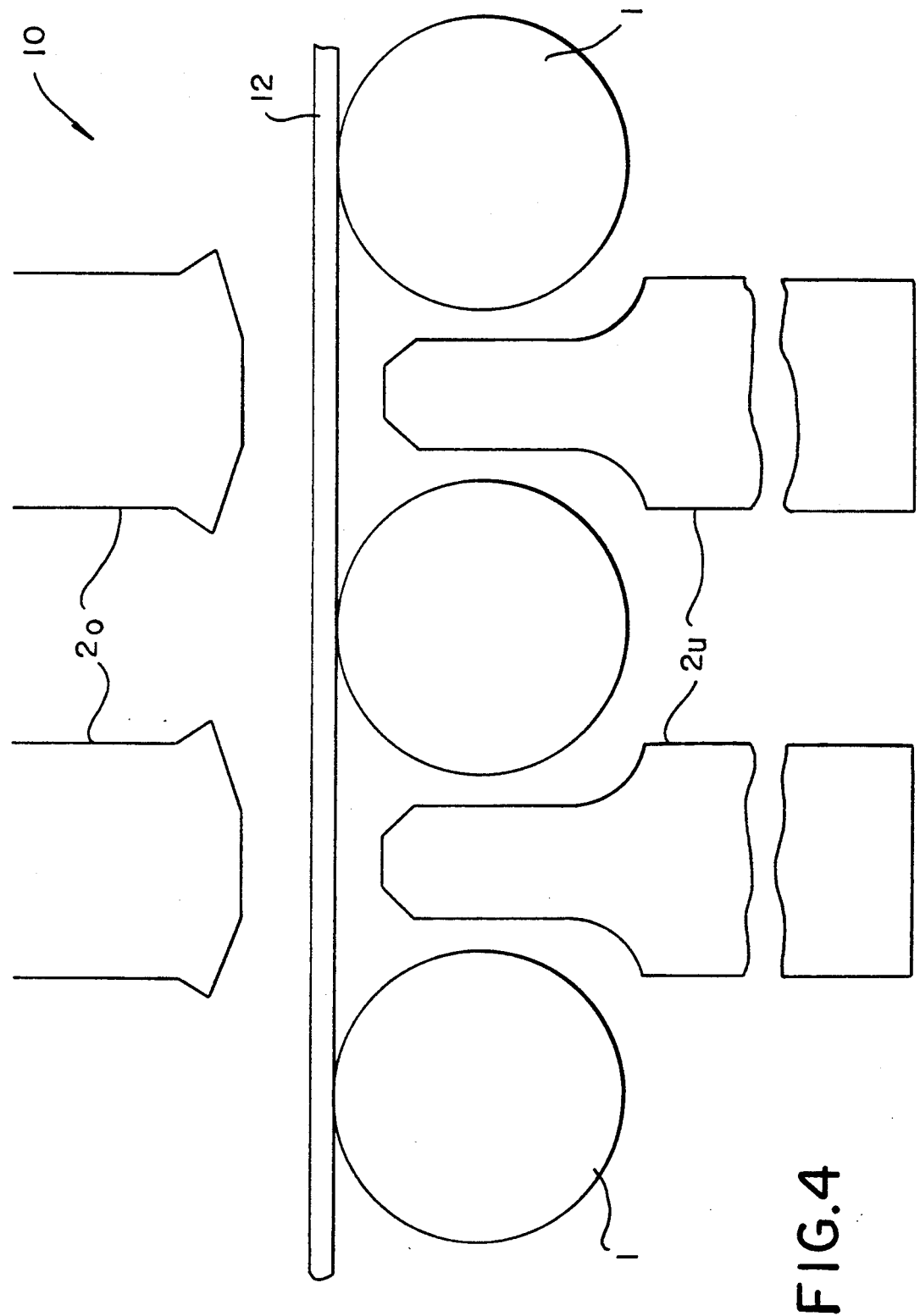

Above the glass sheets 12 the upper nozzle ribs $2_o$ are arranged opposite the lower nozzle ribs $2_u$ as also apparent from FIG. 4.

To obtain the same heat transfer at the lower side and upper side of the glass sheets 12 the nozzle ribs 2 must be formed in such a manner that on the lower side between the rollers 1 adequate flow-off cross-section remains and on the upper side a similar impact picture is achieved to that on the lower side. In addition, by their form the upper nozzle ribs $2_o$ must compensate the dam-up effect at the upper side arising due to the rollers 1 at the lower side between the lower nozzle ribs $2_u$ because otherwise there is a danger that thin glass sheets 12 will be lifted from the rollers 1 by the strong blowing from below or at least no longer reliably conveyed.

As apparent from the cross-section according to FIG. 1 the nozzle ribs 2 extend over the entire inner width of the high-convection heating apparatus or treatment space 14 whilst the rollers 1 (see FIG. 2) project laterally out of the treatment space 14 and are thus mounted and driven outside the treatment space 14.

This means that the roller length depends solely on the required working width and on the construction of the wall depending essentially on the temperature in the treatment space 14. The mounting of the rollers 1 is in known manner outside the treatment space 14, preferably on a special mounting frame.

Figure 2:
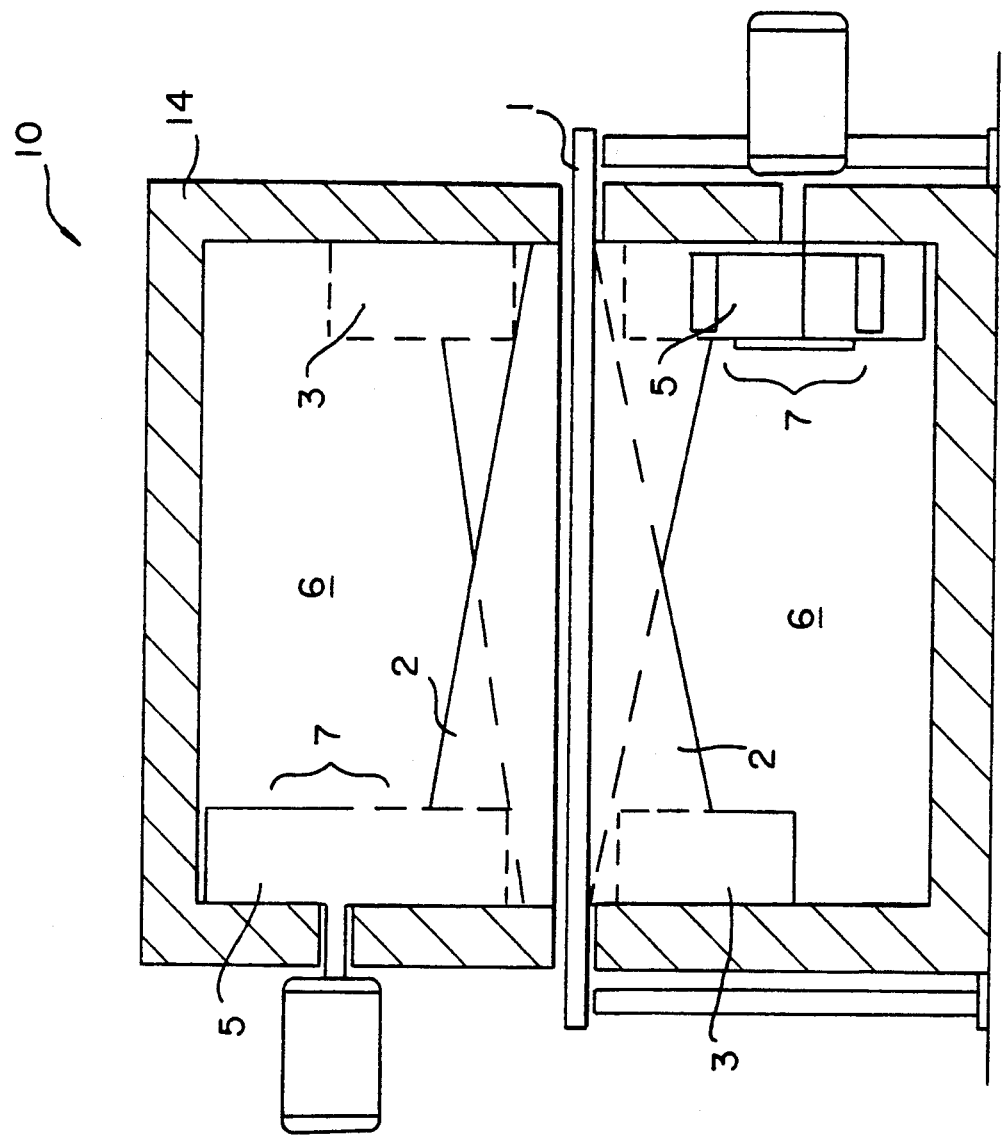
FIG. 2 is a cross-section of said high-convection furnace.
Figure 3:
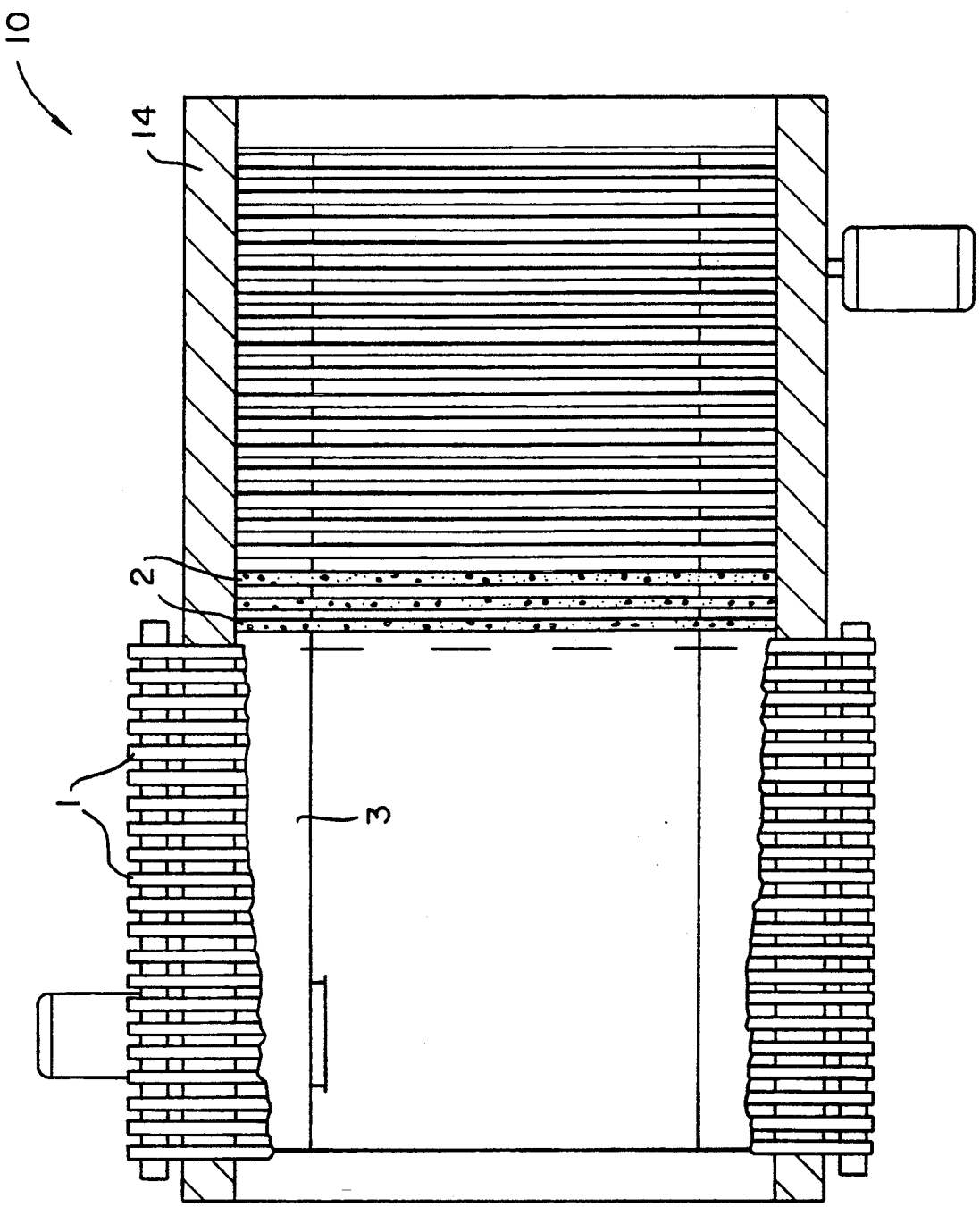
FIG. 3 is a horizontal section of the high-convection furnace and FIG. 4 is an enlarged fragment of a longitudinal section showing the arrangement of the nozzle ribs and rollers for supporting and transporting the material web to be treated.

In FIG. 2 blow-out ducts 3 can be seen which act on the nozzle ribs 2 from the side and are accordingly located at one wall of the treatment space 14. The nozzle ribs 2 taper from the charging side towards their end as can likewise be seen in FIG. 2. A longitudinal view of the blow-out ducts 3 with following distributor pieces 4 is shown in FIG. 2. By reducing the flow cross-section of the distributor pieces 4 or of the nozzle ribs in the flow direction it is ensured that in said cross-section in spite of decreasing volume flow the flow velocity remains approximately constant.

In the high-convection heating apparatus for glass sheets illustrated in the Figures the flow drive is a radial fan, that is a drum impeller 5, and each drum impeller 5 supplies a quarter of the total nozzle ribs 2. This means that for installation of the drum impeller and the distributer piece 4 or blow-out duct 3 following said impeller half the internal length of a unit of said high-convection heating apparatus 10 is available. To simplify the illustration only one such unit is shown in the Figures. Of course, any desired number of such units may be arranged one behind the other if this is necessary in order to obtain the desired throughput performance.

The drum impeller 5 is installed in a 360° spiral housing (cf. FIG. 2); its blow-out duct 3 has a length necessary for obtaining the optimum efficiency of said drum impeller, i.e. corresponding at least to a hydraulic diameter of the fan blow-out cross-section, in order to ensure the necessary uniformity of the flow.

As can be seen in particular from FIGS. 1 and 2, for each unit of said high-convection heating apparatus a drum impeller 5 is provided above and below the glass sheet 12 and is located at a wall of the treatment space 14, blowing the treatment gas via the blow-out duct 3 and the distributor piece 4 into the associated nozzle ribs 2. The drum impellers 5 of each unit are arranged point symmetrically at 180° as can be seen from FIGS. 1 and 2, i.e. in the cross-section according to FIGS. 1 and 2 the lower drum impeller 5 is on the left side of the treatment space 14 and the upper drum impeller 5 on the right side of the treatment space. In the next unit this arrangement is converse.

The entire interior 6 of the treatment space 14 below or above the nozzle ribs is available for installing a heating means or when operating a corresponding high-convection apparatus as cooling zone or cooling means.

Since the intake region 7 of each drum impeller 5 is disposed beneath or above the nozzle ribs 2 in a region in which the treatment gas is blown out by the oppositely disposed drum impeller 5, a very uniform mixture of the circulated gas stream arises. This gives a very uniform temperature distribution in the gas flow.

The charging of the nozzle ribs 2 of a unit in the first half on the one side and in the second half from the opposite side compensates differences which result for example from temperature changes of the gas stream on flowing through the nozzle ribs 2. For if the nozzle ribs 2 were charged always only from the same side of said high-convection heating apparatus 10 because of this interfering influence a wedge-shaped temperature profile could result in the material web and this is avoided by the bilateral charging described.

It has been found expedient for each drum impeller 5 to supply the same number of nozzle ribs 2 which are identical in their major dimensions, so as to contribute to uniform flow action in this manner as well.

I claim:

1. An apparatus for the bilateral blowing of a treatment gas onto a sheet material moving in a substantially linear direction through a treatment chamber, comprising:
   a treatment space for the sheet material comprising a unit length of said treatment chamber;
   a plurality of nozzle ribs arranged on both sides of the sheet material in the treatment space for introducing the treatment gas into the treatment space, said nozzle ribs being parallel to a plane of the sheet material and normal to the direction of movement of the sheet material; and
   radial fans arranged on both sides of the sheet material in a space adjacent each edge of the sheet material in the treatment space for generating a stream of treatment gas supplied to said nozzle ribs at one edge of the sheet material in the treatment space and for recirculating the treatment gas from the treatment space adjacent the opposite edge of the sheet material, each of said radial fans comprising a radial fan installed in a 360° spiral housing with the axis of rotation of said fan parallel to the sheet material and perpendicular to the direction of movement of said sheet material, two radial fans on each side of the sheet material are arranged point-symmetrically at 180° relative to a reference line traversing the sheet material at the center of said treatment space and each radial fan blows into a blow-out duct extending longitudinally at one side of the treatment space adjacent one edge of the sheet material, each blow-out duct includes a first region of substantially constant cross-section and a distributor piece downstream of said first region, and said plurality of nozzle ribs are attached in fluid communication with one of said distribution pieces.

2. An apparatus according to claim 1, wherein each radial fan has the same number of nozzle ribs attending in fluid communication with its respective distribution piece and said nozzle ribs are arranged to extend to the same width transversely of the direction of movement of the sheet material.

3. An apparatus according to claim 1, wherein the radial fans are constructed as drum impellers.

4. An apparatus according to claim 1, wherein the region of the blow-out duct with constant cross-section is at least one hydraulic diameter of the fan blow-out cross-section long.

5. An apparatus according to claim 1, wherein the nozzle ribs extend over the entire inner width of the treatment space.

6. An apparatus according to claim 1, wherein the distributor piece for supplying the nozzle ribs is arranged laterally above the entrance cross-section thereof.

7. An apparatus according to claim 1, wherein rollers are arranged between at least some of the nozzle ribs of the lower half of the apparatus for the support and transport of the sheet material, the mounting of which is disposed in each case laterally outside the treatment space.

8. An apparatus according to claim 1, wherein the nozzle ribs are constructed as floating nozzles for contactless guiding of the sheet material.

9. An apparatus according of claim 1 comprising a division between the upper and lower nozzle ribs in the vicinity of the plane of symmetry between the upper and lower nozzle ribs parallel to the sheet material.

10. An apparatus according to claim 1 comprising a division plane between upper and lower part corresponding exactly or approximately to the working height for the sheet material of at the most 1.5 m and a working width of up to about 3 m.

11. An apparatus according to claim 1, wherein the distributor piece has a cross-section diminishing in the flow direction.

* * * * *